United States Patent [19]

Chauveau et al.

[11] Patent Number: 4,721,327
[45] Date of Patent: Jan. 26, 1988

[54] SUSPENSION UNIT FOR VEHICLES WITH BUILT-IN DAMPER

[75] Inventors: Jean-Marc Chauveau, Chaville; Claude A. Chambon, Orsay, both of France

[73] Assignee: Lucas France S.A., Paris, France

[21] Appl. No.: 909,831

[22] Filed: Sep. 19, 1986

[30] Foreign Application Priority Data

Sep. 19, 1985 [FR] France .............................. 85 13935

[51] Int. Cl.⁴ ............................................ B60G 11/26
[52] U.S. Cl. .................................................... 280/705
[58] Field of Search ............... 280/683, 698, 702, 705, 280/709; 180/9.1, 9.6; 267/9 R, 57

[56] References Cited

U.S. PATENT DOCUMENTS 3,047,283  7/1962  Kivell ................................. 267/9 R
3,521,527  7/1970  Gies et al. ........................... 280/705
4,447,073  5/1984  Brandstadter ...................... 280/705

FOREIGN PATENT DOCUMENTS 0090154  5/1983  European Pat. Off. .

Primary Examiner—Richard A. Bertsch
Attorney, Agent, or Firm—Blakely, Sokoloff, Taylor & Zafman

[57] ABSTRACT

A suspension system for vehicles includes an arm that can oscillate relative to a support. The arm has an angular position of equilibrium relative to the support. Rotation of the arm is damped by a system comprising two complementary friction brake members, one fastened to the arm and the other to the support. The complementary brake members are pressed together to impede such rotation. The force with which the brake members are pressed together is conditioned according to the speed of rotation of the arm relative to the support. The damping curve may therefore be of any required shape, and in particular procure a constant damping force from a predetermined threshold of the speed of rotation of the arm relative to the support. This considerably simplifies dealing with heating problems arising from the damper action.

29 Claims, 8 Drawing Figures

FIG_2

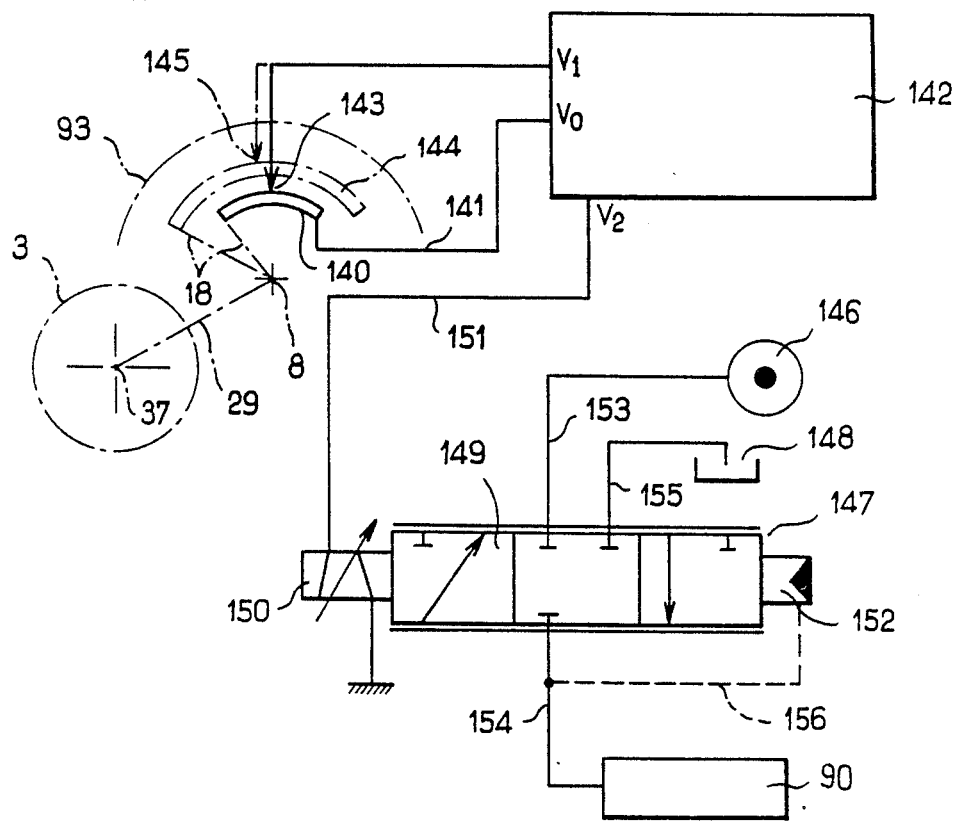
FIG_5
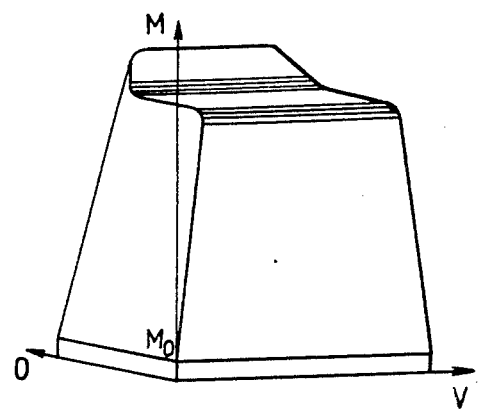
FIG_8

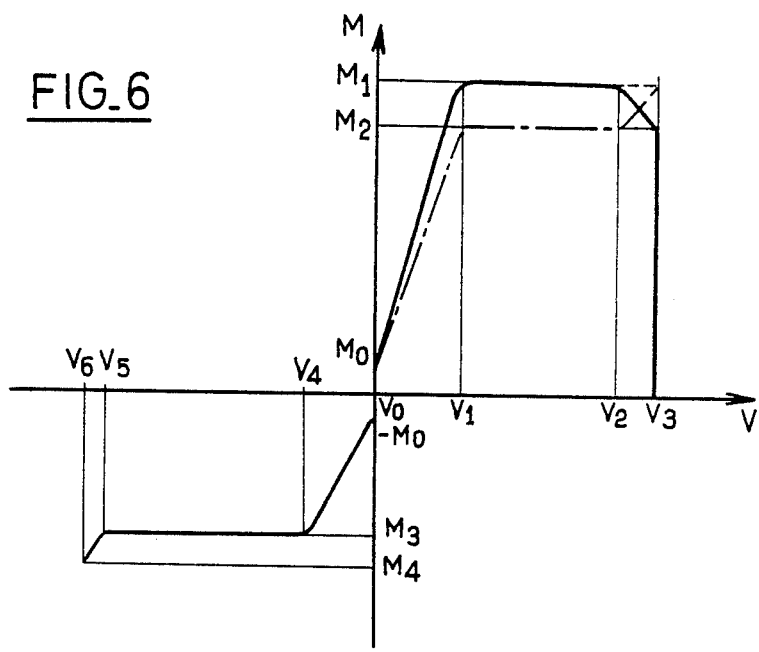
FIG_6
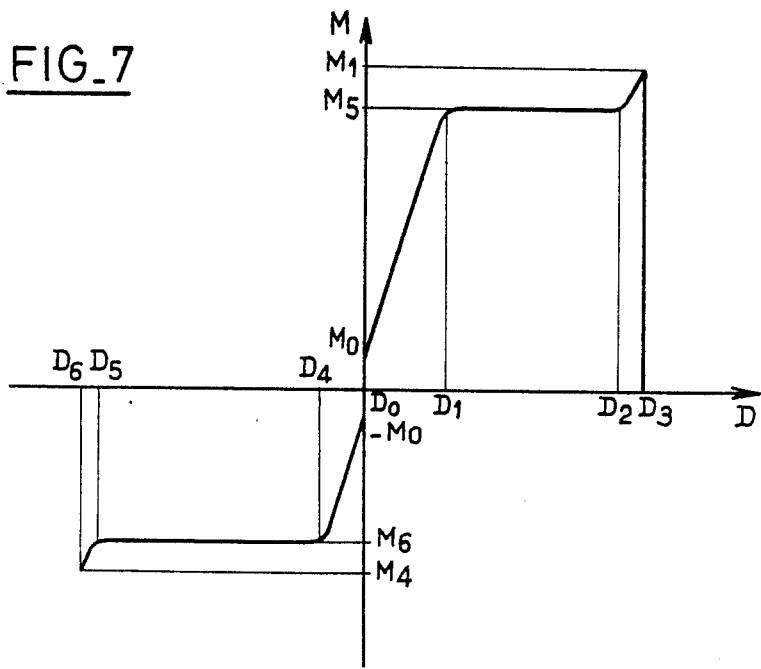
FIG_7

SUSPENSION UNIT FOR VEHICLES WITH BUILT-IN DAMPER

BACKGROUND OF THE INVENTION

1. Field of the Invention

The present invention concerns a suspension unit for vehicles with built-in damper.

To be more precise, the present invention concerns a suspension unit of the type comprising:

a support adapted to be attached to a framework of the vehicle, a longitudinal arm, means coupling a rolling member to said arm defining a transverse first axis of rotation of said rolling member relative to said arm, first means coupling said arm to said support defining a transverse second axis of rotation of said arm relative to said support, said second axis being parallel to said first axis and offset from it longitudinally, second means coupling said arm to said support defining an angular equilibrium position of said arm for rotation about said second axis relative to said support and elastically enabling rotation of said arm about said second axis relative to said support in two opposite directions from said angular equilibrium position, and means damping said rotation of said arm.

2. Description of the Prior Art

In known suspension unit of this type the damper means are of the hydraulic type and employ two hydraulic fluid chambers inside the arm the volumes of which vary concommitantly, inversely to each other, when the arm pivots about the second axis relative to the support; the two chambers are connected by means defining a restriction and which permit the fluid to flow from one chamber to the other sufficiently slowly to damp rotation of the arm.

The circulation of the hydraulic fluid, and in particular that through the restriction means, naturally heats the fluid, proportionately to the degree to which the suspension is loaded, that is to say more strongly as the arm executes faster and more frequent rotation movements relative to the support; this heating entails provision of means for cooling the hydraulic fluid, either integrated into the arm, which results in a considerable increase in its overall dimensions, weight and inertia and thus compromises the quality of the suspension, or separately from the arm, which makes it necessary to provide flexible connecting hoses between the arm and the means cooling the hydraulic fluid which are particularly vulnerable and are particularly inconvenient since suspension units of the type indicated in the preamble are generally fitted to civilian or military vehicles designed for use on unusually difficult terrain, where there is a high risk of damaging such hoses.

It also appears that such damper means using circulation of hydraulic fluid through restriction means cannot withstand rapidly applied loads, unless of complex and costly design.

To be more precise, it is generally accepted that damper means are satisfactory when they apply a damping force (or moment) that is:

appproximately proportional to the speed of vertical displacement of the rolling member relative to the vehicle (or the speed or rotation of the arm relative to the support) provided that this speed remains below a predetermined threshold, and approximately constant immediately the speed exceeds this predetermined threshold.

Hydraulic fluid damper means as provided until now in oscillating arm suspension units only meet this criterion up to a second threshold of the speed of vertical displacement of the rolling member relative to the vehicle is reached; immediately the second threshold is exceeded, the damping force or moment is once again proportional to the speed of vertical displacement on the rolling member relative to the vehicle and may reach values likely to result in damage to or even destruction of the hydraulic circuit and the hydraulic fluid constituting the damper means.

In an attempt to alleviate these disadvantages, it is proposed in U.S. Pat. No. 4,447,073 to implement damper means for a suspension unit of the type indicated hereinabove in a form comprising:

two complementary friction brake members, means immobilizing said members against rotation about the second axis respectively relative to the arm and relative to the support, means pressing together the friction brake members, and means conditioning the force with which the friction brake members are pressed together according to the speed of rotation of the arm about the second axis relative to the support in one direction only referred to as the "first direction".

In practise these conditioning means consist of a single-acting piston pump cooperating with a cam to alternately draw up hydraulic fluid in a storage tank and discharge it to hydraulic jack means constituting the means pressing together the complementary friction brake members, as the arm rotates, with the result that:

on rotation of the arm in the first direction, corresponding to a discharge phase, the value of the force with which the friction brake members are pressed together, that is to say the damping force or the moment of this force about the second axis, increases from a minimum to a maximum and then decreases in accordance with a predetermined law, and on rotation of the arm in the second direction, corresponding to an aspiration phase, the value of this force, that is of the damping force or moment, remains substantially at the aforementioned minimum value.

The hydraulic fluid then no longer contributes to the damping proper, as the heating phenomena associated with the damping action are then observed at the level of the complementary friction brake means, that are less vulnerable and easier to cool, and the value of the damping force or moment then remains limited, but the way in which this force or moment changes and the structure of the damper means disclosed in the aforementioned document, which are indissociably associated with each other, cannot be regarded as totally satisfactory since, in particular, it is not possible to exert any influence over the damping action on rotation of the arm in the second direction.

An object of the present invention is to alleviate these disadvantages.

SUMMARY OF THE INVENTION

In one aspect, the present invention consists in a suspension system for vehicles comprising:

a support adapted to be attached to a framework of the vehicle, a longitudinal arm, means coupling a rolling member to said arm defining a transverse first axis of rotation of said rolling member relative to said arm, first means coupling said arm to said support defining a transverse second axis of rotation of said arm relative to said support, said second axis being parallel to said first axis and offset from it longitudinally, second means coupling said arm to said support defining an angular equilibrium position of said arm for rotation about said second axis relative to said suppport and elastically enabling rotation of said arm about said second axis relative to said support in two opposite directions from said angular equilibrium position, two complementary friction brake members, means immobilizing said friction brake members against rotation about said second axis respectively relative to said arm and said support, means pressing together said friction brake members, means conditioning the force with which said pressing means press said friction brake members together according to the speed of rotation of said arm about said second axis relative to said support in a first direction, and means conditioning the force with which said pressing means press said friction brake members together according to the speed of rotation of said arm about said second axis relative to said support in a second direction opposite to said first direction.

By conditioning the force with which the complementary brake members are pressed together, that is to say the damping force, according to the speed of rotation of the arm relative to the support in one direction or the other, it is possible to give any required shape to the damping curve, meaning a curve showing the damping force or moment as a function of the speed of vertical displacement of the rolling member relative to the vehicle; specifically, the damping force or moment may be made constant from a given value of the speed of vertical displacement of the rolling member after increasing proportionately to this speed, whether this displacement is in one direction or the opposite direction.

Retaining the same flexibility of choice with regard to the corresponding damping curve, provision may be made for conditioning this force also according to the amplitude of rotation of the arm about the second axis relative to the support in the first and/or second direction, using means that may advantageously consist of the aforementioned means for conditioning this force to the speed of rotation of the arm about the second axis relative to the support in the first and/or the second direction.

Although the hydraulic fluid may be used as the means of conditioning the force with which the complementary friction brake members are pressed together according to the speed of rotation of the arm relative to the support, the hydraulic fluid does not contribute to the damping action proper, which makes it possible to avoid the problems, especially of overheating, associated with the more usual use of the hydraulic fluid as damper means.

In a second aspect, the invention consists in a suspension system for vehicles comprising:

a support adapted to be attached to a framework of the vehicle, a longitudinal arm, means coupling a rolling member to said arm defining a transverse first axis of rotation of said rolling member relative to the arm, first means coupling said arm to said support defining a transverse second axis of rotation of said arm relative to said support, said second axis being parallel to said first axis and offset from it longitudinally, second means coupling said arm to said support defining an angular equilibrium position of said arm for rotation about said second axis relative to said support and elastically enabling rotation of said arm about said second axis relative to said support in two opposite directions from said angular equilibrium position, two complementary friction brake members, means immobilizing said friction brake members against rotation about said second axis respectively relative to said arm and said support, means pressing together said friction brake members, means sensing the speed of rotation of said arm about said second axis relative to said support in a first direction and producing a first signal the value of which is representative of said rotation speed, means controling said means pressing together said friction brake members according to the value of said first signal to condition the force with which said pressing means press said friction brake members together according to said value of said first signal, and means sensing the speed of rotation of said arm about said second axis relative to said support in a second direction opposite to said first direction and producing a second signal the value of which is representative of said rotation speed, said control means also controling said means pressing together said friction brake members according to the value of said second signal to condition the force with which said pressing means press said friction brake member together according to said value of said second signal.

According to a prefered embodiment, means are also provided to further condition the value of said first and/or second signal according to the angular position of said arm relative to said support.

Means filtering the first and second signals are advantageously provided to limit the force with which the pressing means press the friction brake members together and render this force substantially independent of low-speed and/or low-amplitude and/or high-frequency rotation of the arm relative to the support.

The sensing means may be of the electromechanical, electromagnetic or opto-electronic type, in which case the signal is an electrical signal and the control means are of the electronic or electrohydraulic or electromechanical type; use may instead be made, however, of mechanohydraulic sensing and control means, in which case the signal is a hydraulic signal.

Thus in one embodiment of the present invention, for example, the means conditioning the force with which the complementary brake members are pressed together comprise a cam fastened to one of the mutually mobile elements, namely the support and the arm, and piston pumps immobilized relative to the other of these elements, against rotation about the rotation axis of the arm relative to the support; the pistons are moved by the cam on rotation of the arm relative to the support so as to deliver according to the speed and possibly the angle of rotation of the arm relative to the support a flow of hydraulic fluid used to press together the complementary brake members; to this end there is provided, branching from the circuit connecting the piston pumps and the means for pressing together the complementary brake members, a restriction leading to a hydraulic fluid storage tank, this restriction permitting a calibrated leakage flowrate generating a predetermined head loss which determines the pressure in the connecting circuit; it is thus possible, using a compact and easily manufactured construction, to control precisely the force with which the brake members are pressed together in accordance with the speed and possibly the amplitude of movement of the arm relative to the support; this force, that is to say the damping force, may easily be rendered constant when the speed of rotation of the arm relative to the support exceeds a predetermined threshold by providing, branching from the hydraulic circuit connecting the piston pumps to the means for pressing together the complementary brake members, a relief valve enabling part of the hydraulic fluid to be shunted to a storage tank immediately the pressure in the circuit exceeds a predetermined threshold, which then determines the maximum damping force; the aforementioned restriction also constitutes a filter such that low-speed, low-amplitude or high-frequency pivoting of the arm relative to the support has no influence on the force with which the brake members are pressed together, in other words on the damping force; the throttling of the hydraulic fluid in such restriction means is in no way comparable, in particular with regard to its temperature increase consequences, with the throttling effect used to bring about damping in suspension systems employing hydraulic damper means.

When the damper means are of the type specified by the present invention, heat is generated virtually exclusively by the complementary friction brake members in contact with each other which can advantageously be cooled by establishing in their vicinity a circulation of hydraulic fluid which is stirred up on rotation of the arm relative to the support and which advantageously constitutes a reserve from which the piston pumps take up fluid on such movement.

In a final aspect, the invention consists in a suspension system for vehicles comprising:

a support adapted to be attached to a framework of the vehicle, a longitudinal arm, means coupling a rolling member to said arm defining a transverse first axis of rotation of said rolling member relative to said arm, first means coupling said arm to said support defining a transverse second axis of rotation of said arm relative to said support, said second axis being parallel to said first axis and offset from it longitudinally, second means coupling said arm to said support defining an angular equilibrium position of said arm for rotation about said second axis relative to said support and elastically enabling rotation of said arm about said second axis relative to said support in two opposite directions from said angular equilibrium position, two complementary friction brake members, means immobilizing said friction brake members against rotation about said second axis respectively relative to said arm and said support, hydraulic jack means pressing together said friction brake members, a storage tank for hydraulic fluid, first means pumping hydraulic fluid in said storage tank to said hydraulic jack means, means returning hydraulic fluid from said hydraulic jack means to said storage tank and incorporating means determining a calibrated leakage flowrate, means driving said first pumping means by rotation of said arm about said second axis relative to said support so that rotation of said arm relative to said support in a first direction causes fluid to flow towards said hydraulic jack means and said return means to establish a damping action conditioned at least by the speed of rotation of said arm relative to said support and rotation of said arm relative to said support in a second direction opposite to said first direction causes fluid to be pumped in said storage tank, second means pumping hydraulic fluid in said storage tank to said hydraulic jack means, means driving said second pumping means in phase opposition to said first pumping means by rotation of said arm about said second axis relative to said support so that rotation of said arm relative to said support in said first direction causes fluid to be pumped in said storage tank and rotation of said arm relative to said support in said second direction causes fluid to flow to said hydraulic jack means and said return means to establish a damping action conditioned at least by the speed of rotation of said arm relative to said support, respective check valves disposed between each of said first and second pumping means and said hydraulic jack means to permit fluid to flow towards said hydraulic jack means.

Other characteristics and advantages of the invention will emerge from the following description of two embodiments of the invention given by way of non-limiting example only and with reference to the appended drawings which form an integral part of the description.

BRIEF DESCRIPTION OF THE DRAWINGS

FIG. 5 shows schematically an alternative embodiment of the damper means using electromechanical type sensing means and electronic or electrohydraulic type control means.

FIG. 6 is a diagram showing one example of the trend of the curve of the damping moment plotted as a function of the speed of rotation of the arm relative to the support in the case of the FIG. 5 embodiment.

FIG. 7 is a diagram showing one example of the trend of the curve of the damping moment plotted as a function of the amplitude of rotation of the arm relative to the support in the case of the FIG. 5 embodiment, to be more precise as a function of the angular position of the arm relative to the support.

FIG. 8 is a partial combination of the diagrams from FIGS. 6 and 7.

DESCRIPTION OF THE PREFERRED EMBODIMENT

Figure 1:
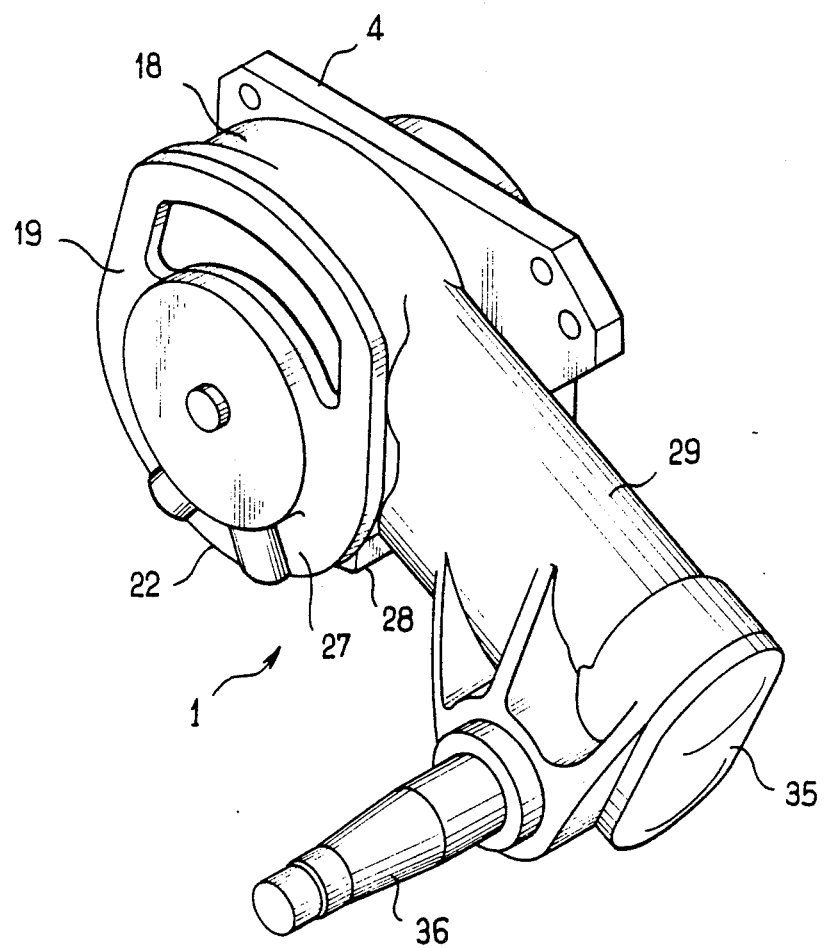
FIG. 1 is a perspective view of a suspension unit in accordance with the present invention in a position of static equilibrium when the unit is mounted on a vehicle resting on a horizontal plane.

The suspension unit 1 is shown in equilibrium positions that is can assume when it is mounted on a vehicle, schematically represented by its framework 2, with the vehicle resting on a horizontal plane through a rolling member schematically represented at 3, such as a road wheel or a caterpillar track roller, depending on the type of vehicle in question.

The unit 1 will be described with reference to these positions and these equilibrium states, and it is to be understood that such terms as horizontal, vertical, level and direction used in this description have no limiting character and are to be interpreted as a simple indication of the relative positions of the various components parts of the suspension unit 1.

For mounting it on the framework of the vehicle the suspension unit 1 illustrated comprises a support 4 in the form of a vertical plate 6 which may be fastened to the framework of the vehicle, by means of bolts 5, for example, and to which is fastened, for example by being formed in one piece with it, a shaft 7 the axis 8 of which is horizontal, perpendicular to the plate 4; when the support 4 is attached to the framework 2 of the vehicle the shaft 7 projects externally of the vehicle.

Figure 2:
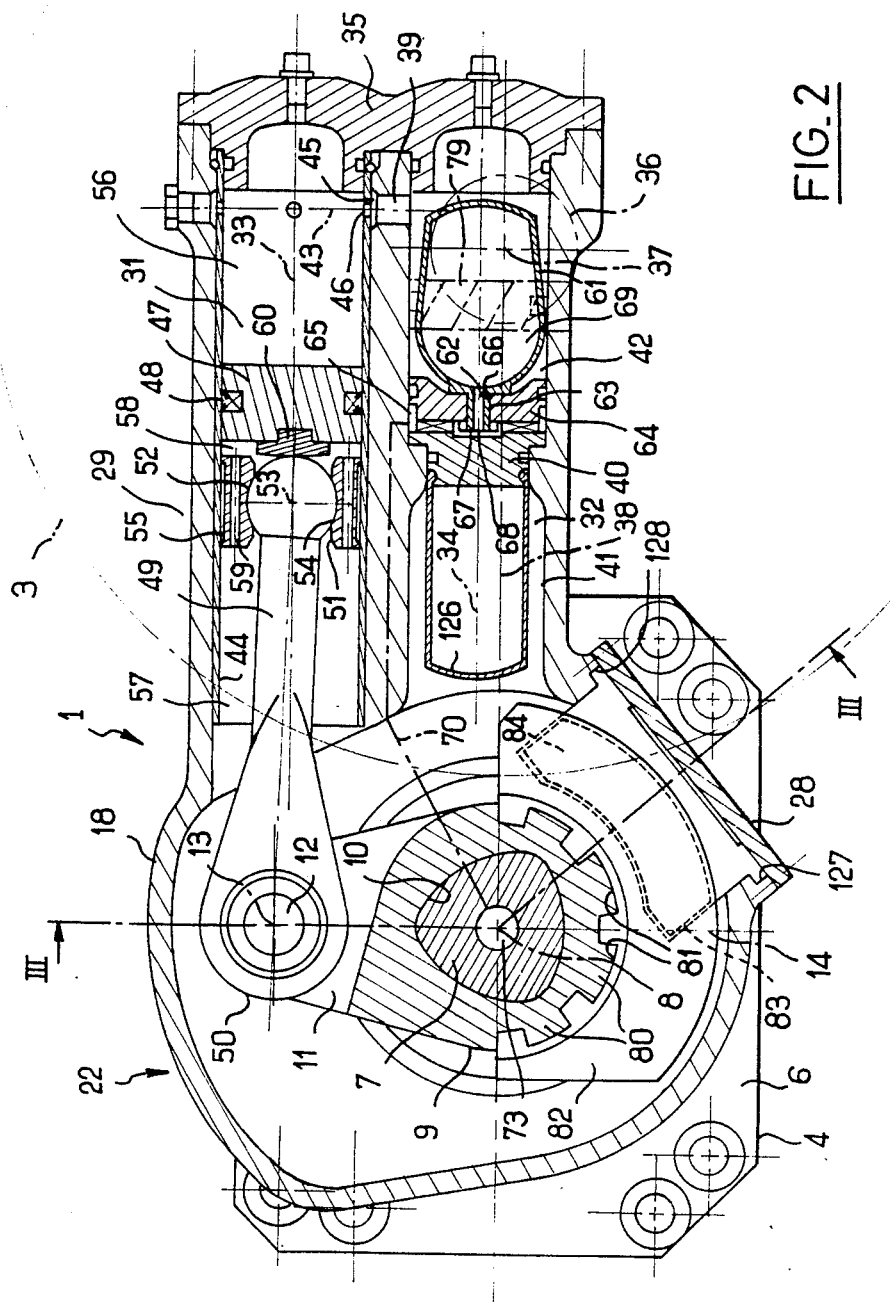
FIG. 2 is a view of the unit in partial cross-section on the line I—I in FIG. 3, in a state of dynamic equilibrium.

The shaft 7 carries a crank 9 which is prevented from rotating relative to the shaft 7 about its axis 8 by an arrangement of complementary shapes; the crank 9 has a bore 10 through which the shaft 7 passes and, transversely to the axis 8, the bore 10 and the shaft 7 have respective complementary polygonal cross-sections, as shown in FIG. 2; any other means of fastening the crank 9 and the shaft together, in particular to prevent relative rotation about the axis 8, may be used without departing from the scope of the present invention; a conventional keying arrangement may be used, for example, or cooperation between the bore 10 and the shaft 7 by means of complementary splines.

Above the shaft 7 the crank 9 forms a yoke 11 to which is fastened a journal 12 the axis 13 of which is parallel to, above and in a common vertical plane 14 with the axis 8; like the axis 8, this axis 13 is fixed relative to the support 4; on respective opposite sides of the yoke 11 in a direction parallel to the axis 8, the crank 9 defines two integral sleeves 20 and 21 respectively situated between the yoke 11 and the plate 6 and on the opposite side of the plate 6 relative to the yoke 11; to each of the sleeves 20 anad 21 is fastened the inner cage of a respective thrust bearing 16, 17 having an outer cage respectively fastened to a casing 18 and a flange 19, these being annular and fastened to each other, so as to guide the casing 18 and the flange 19 in rotation about the axis 8 relative to the crank 9 and the shaft 7 without any possibility of relative translation movement parallel to the axis 8; to this end, the inner cages of the bearings 16 and 17 are also respectively trapped betwen the plate 6 and the yoke 4 and between the yoke 11 and an abutment plate 93 fastened to the member 7, by means of bolts 92, for example, opposite the attachment of the shaft 7 to the plate 6.

The casing 18 is fluid-tight and surrounds the crank 9 on the same side as the plate 6 of the support 4 and in the radial direction away from the axis 8; around the bearing 16 and the sleeve 20 the casing 18 has an annular ring 23 which is a body of revolution about the axis 8, projecting towards the plate 6 and inserted in a complementary groove 24 formed in the plate 6 so that it is able to rotate about the axis 8; the plate 6, which is itself fluid-tight, and the ring 23, which is also fluid-tight, are sealed to each other by sealing means 25, 26 the nature and location of which are easy to determine for those skilled in the art.

The flange 19, which is also fluid-tight, is fastened in fluid-tight manner to the casing 18 and covers the crank 9 on the side opposite the casing 18; it has an orifice in the shape of a body of revolution about the axis 8 which is shut off in fluid-tight manner by a cover 27 in the general shape of a disk perpendicular to the axis 8 and attached to it; similarly, an orifice in the casing 18 is shut off in fluid-tight manner by a cover 28 attached to it, in such a way that the support 4, the casing 18, the flange 19, the cover 27 and the cover 28 together define a fluid-tight housing 22 enclosing the crank 9, the journal 12 and the two bearings 16 and 17.

As will emerge hereinafter, the housing 22 contains a substantially incompressible hydraulic fluid, in practise oil, which fills to the maximum the housing 22 which may also contain air.

Figure 3:
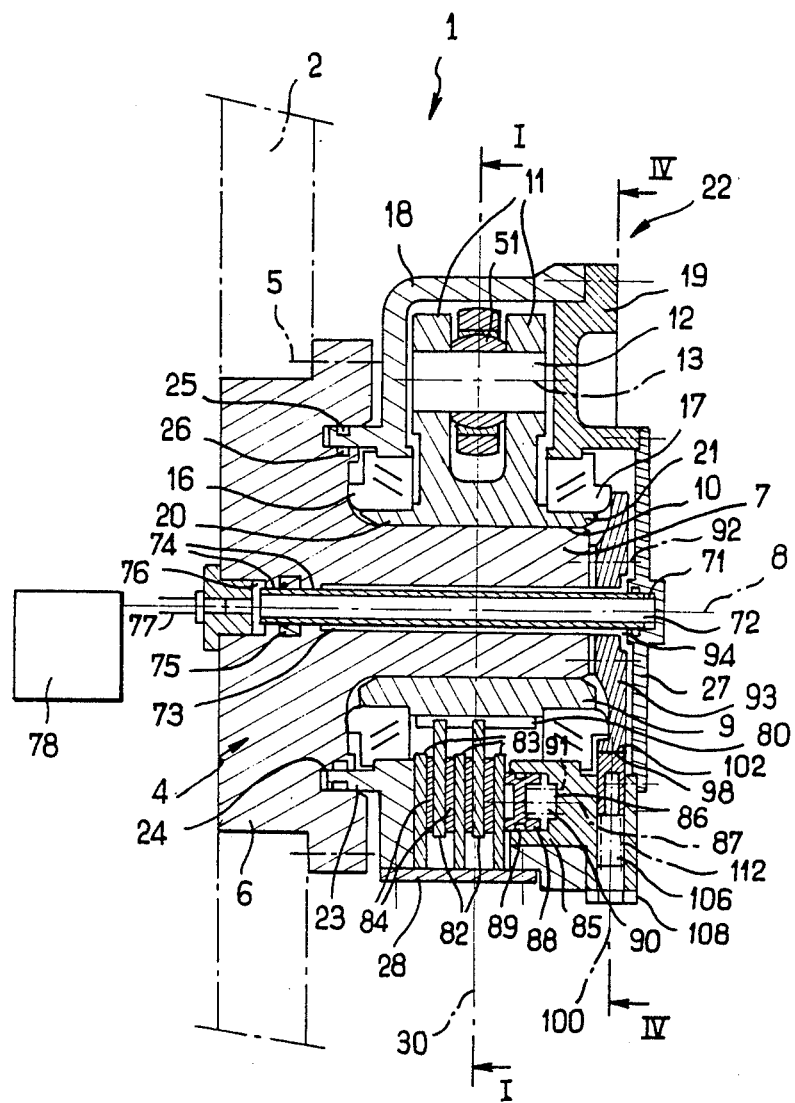
FIG. 3 is a view of the suspension unit in cross-section on the broken line III—III in FIG. 2, in the case of damper means employing mechanohydraulic type sensing and control means.

The casing 18 carries a longitudinal hollow arm 29 projecting relative to the housing 22 in a plane 30 perpendicular to the axis 8 and coincident with the section plane I—I in FIG. 3; the arm is preferably in one piece with the casing 18.

Figure 4:
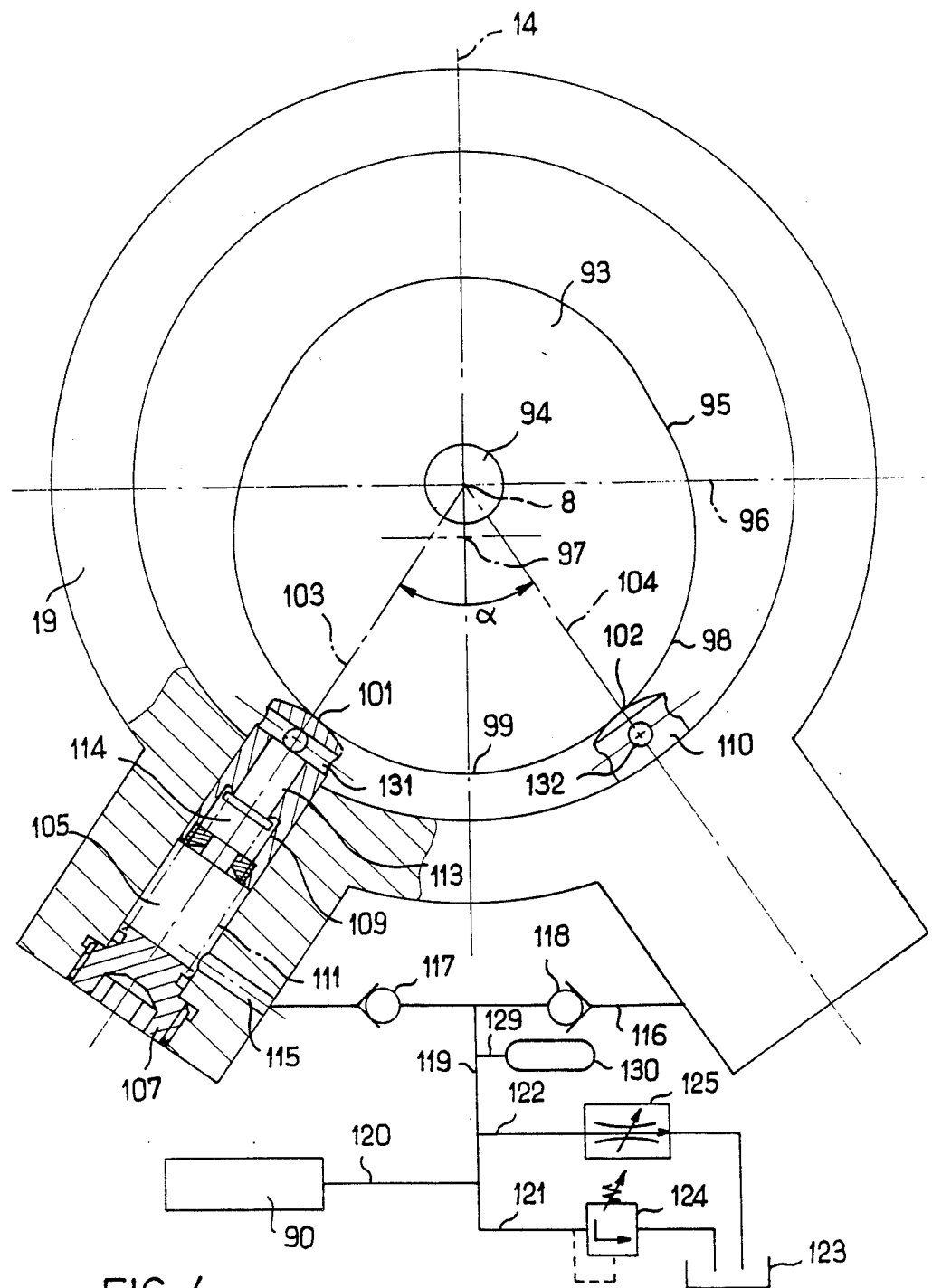
FIG. 4 is a view of a suspension unit in the state of static equilibrium shown in partial cross-section on the line IV—IV in FIG. 3 which is parallel to the line I—I, FIG. 4 also showing schematically a hydraulic circuit forming part of the damper means with which the suspension unit shown in FIG. 3 is provided.

The arm 29 is shown in a horizontal orientation in FIG. 2 but it is to be understood that it can rotate with the housing 22, to which it is fastened, about the axis 8 and relative to the support 4; the arm extends obliquely downwards from the housing 22 in the position shown in FIGS. 1 and 4.

Opposite the end where it is connected to the casing 18 of the housing 22, the arm carries a spindle 36 fastened to it, and advantageously in one piece with it, to guide rotation of the rolling member 3 relative to it about an axis 37 parallel to the axis 8; in the condition shown in FIG. 2, a plane 38 common to the axes 8 and 37 is horizontal but it can equally well be oblique provided that variations in the relative levels of the framework 2 of the vehicle and the rolling member 3 result in rotation of the arm 29 relative to the support 2 about the axis 8.

The arm 29 is hollow, comprising two tubular cavities 31 and 32 with respective rectilinear longitudinal axes 33 and 34 parallel to each other and to the plane 38 and situated in the plane 30 so that the cavity 31 is above the cavity 32, the axes 33 and 34 are both above the plane 38, and the axis 33 of the upper cavity 31 intersects the plane 14 in the immediate vicinity of the axis 13.

At one transverse end, where the arm 29 is fastened to the casing 18, the cavities 31 and 32 communicate unrestrictedly with the interior of the housing 22 whereas at their other transverse end, constituting the area of the arm 29 farthest away from the housing 22, they are closed by fluid-tight cover 35 fastened in fluid-tight manner to the arm 29 which is itself fluid-tight.

Approximately halfway between its two transverse ends, the lower cavity 32 is permanently closed off by a fluid-tight bulkhead 40 attached to the arm 29 so that the lower cavity 32 comprises, in the immediate vicinity of the casing 18, a chamber 41 communicating directly with the interior of the housing 22 and, in the immediate vicinity of the cover 35, a chamber 42 communicating permanently with the cavity 31 through a fluid passage hole 39 formed between the two cavities 31 and 32 in a direction 43 perpendicular to the axes 33 and 34.

As shown, the cavity 31 is preferably lined with a longitudinal tubular liner 44 in which are one or more orifices 46 facing the hole 39 and an annular groove 45 in the shape of a body of revolution about the axis 33 of the liner, through which the hole 39 discharges into the cavity 31 in the vicinity of the cover 35.

The liner 44 facilitates guidance of longitudinal sliding within the tubular cavity 31 of a fluid-tight piston 47 sealed to the liner 44 by appropriate sealing means 48 and coupled by a rod 49 to the journal 12 attached to the crank 9, so that angular movement of the arm 29 about the axis 8 relative to the support 9 result in longitudinal sliding movement of the piston 47 within the cavity 31, in one direction or the other.

To this end the rod 49 has a first end 50 by which it is pivoted to the journal 12, preferably through the intermediary of a ball joint device 51, so as to be able to pivot about the axis 13 relative to the crank 9; the rod 49 also has a second end 51 disposed within the cavity 31 and itself in the shape of a part-spherical ball 52 the center of which is maintained on the axis 33 by engagement of the ball 52 in a concentric part-spherical bearing surface 54 of an annular slide member 55 in the shape of a body of revolution about the axis 33, which slide member is mounted in the liner 44 on the same side of the piston 47 as the axis 13 so as to be able to slide longitudinally.

The piston 47 is fluid-tight and sealed to the liner 44 so as to delimit with the tubular cavity 31 a fluid-tight chamber 56 situated on the same side as the cover 35 and communicating permanently with the chamber 42 in the cavity 32 and a chamber 57 situated on the same side as the housing 22, with which it communicates, the chamber 57 containing the slide member 55 and the ball member 52; the slide member 55 is designed to allow the hydraulic fluid contained in the housing 22 and in the chamber 57 to pass freely into a space 58 between the slide member 55 and the piston 47; to this end, longitudinal passages 59 are provided in the slide member 55, around the part-spherical bearing surface 54; thus the fluid contained in the housing 22 and the chamber 57 can reach the space 58 and lubricate the slide member 55 and the piston 47 where they are in contact with the liner 44 and the ball member 52 where it is contact with the part-spherical bearing surface 54, as well as where it is in contact with a buffer 60 fastened to the piston 47 on the same side as the chamber 57 to serve as longitudinal abutment means for the piston 47 against the ball member 52, which by virtue of the annular shape of the slide member 55 is totally exposed on the side facing towards the piston 47; this preferred arrangement makes it possible to procure as direct as possible transmission of longitudinal forces between the rod 49 and the piston 47 with minimum transverse loading of the piston 47 by the rod 49; other arrangements could naturally be adopted, for example with the piston 47 abutting not against the rod 49 but against the slide member 55; the way in which the rod 49 is fitted, in particular to the slide member 55, could also be different, provided that it defined at least one relative rotation axis parallel to the axis 13 and intersecting the plane 50 coincident with the center 53 of the ball member 52 and the part-spherical bearing surface 54 of the design as shown.

The piston 47 is urged longitudinally towards the slide member 55 to procure mutual abutting of the buffer 60 and the ball member 52, by means of a compressible fluid, in practise a gas, serving as pneumatic spring means, accommodated in the communicating chambers 56 and 42 and operative directly on the piston 47 in the chamber 56; the hole 39, the groove 45 and the orifice or orifices 46 are of such sizes as to offer virtually no resistance to passage of this fluid from one of the chambers 56 and 42 to the other, that is to say in such a way as not to cause any throttling of the fluid when the piston 42 slides longitudinally within the liner 44.

In the chamber 42 the compressible fluid serving as spring means bathes an elastically expandable, flexible, fluid-tight material bladder 61 which features in the direction towards the bulkhead 40 along the axis 34 an orifice 62 advantageously delimited by a termination 67 forming an integral part of the bladder 61 and projecting along the axis 34 towards the bulkhead 40; by its radially outermost periphery 63 relative to the axis 34, the termination 67 is inserted into a bore 66 along the axis 34 in a fluid-tight wall 64 fastened in fluid-tight manner into the cavity 32, transversely to the axis 34, so as to cover the bulkhead 40 on the side towards the chamber 42 and delimit with the bulkhead 40, in the cavity 32, an intermediate volume 65 which is fluid-tight with respect to the chamber 41 and the remainder of the chamber 42; all of the outside periphery 63 of the termination 67 is in fluid-tight contact with the wall 64, which defines through the latter a passage 68 connecting the interior of the bladder 61 with the volume 65 whilst preserving the fluid-tightness of the latter relative to the part of the chamber 42 external to the bladder 61, in other words vis-a-vis the compressible fluid filling the chamber 42, outside the bladder 61, and 56; the fluid-tight contact between the termination 67 and the wall 64 may result from a simple interference fit of the termination 67 within the bore 66, for example.

The bladder 61 thus delimits internally, within the chamber 42, a chamber 69 which is intended to receive a substantially incompressible hydraulic fluid through the intermediary of the volume 65, the fluid serving to reduce the space available within the chamber 42 for the compressible fluid serving as spring means and, by varying the volume of the chamber 69 as a result of addition of the substantially incompressible hydraulic fluid 2 to or removal of it from this chamber, to oblige a greater or lesser quantity of the compressible fluid to remain in the chamber 56 so as to vary the longitudinal position of the piston 47 in the liner 44 corresponding to equilibrium between the weight of the vehicle and the reaction force on the rolling member from the ground, in other words to vary the ground clearance.

To achieve this, conduits schematically represented by a chain-dotted line 70 are formed within the arms 58, the flange 19 and the cover 27, in a manner that will be readily apparent to those skilled in the art, so as to connect the intermediate volume 65 between the bulkhead 40 and the wall 64 with a chamber 71 formed in the cover 67 and along the axis 8, as can be seen in FIG. 3; the chamber 71 facing the shaft 7 along the axis 8 accommodates one end of a tube 72 on the axis 8 which is fixedly secured and sealed to the cover 27 and which passes through the shaft 7 along the axis 8 as far as the plate 6 by means of a bore 73 formed in the shaft 7 with dimensions such that there remains a peripheral clearance between the tube 72 and the shaft 7; at the plate 6 the tube 72 is guided in rotation relative to the supprot 4 and about the axis 8 by a bearing 74 fitted with a rotary seal 75 and connects to a fluid-tight chamber 76 formed in the plate 6 and itself connected by a conduit 77 to means 78 for adding or removing predetermined amounts of the substantially incompressible fluid; the means 78, which are known in themselves, may comprise a hydraulic pump connected to a hydraulic fluid storage tank within the vehicle, for example.

In an alternative embodiment of the device that has just been described, the bladder 61 could be eliminated and replaced with a piston 79, as schematically indicated in chain-dotted line in FIG. 2, mounted to slide longitudinally within the chamber 42 so as to divide this in fluid-tight manner into a part-chamber communicating directly with the chamber 56 through the hole 39 and a part-chamber corresponding to the chamber 69 in fluid communication with the volume 65 through the bore 70 in the wall 64.

Also, in a manner that is not illustrated and is subject to satisfactor conditions for mutual disposition of the components of the suspension unit 1, the chambers 56 and 42 connected via the hole 39 in the embodiment shown could be in non-parallel alignment with each other and/or relative to the plane 38, in the plane 30 or offset relative thereto; in particular, the chambers 56 and 42 could be aligned with each other along the axis 33, for example, in which case there would be aligned with this same axis the piston 47, the combined chambers 56 and 42, the bladder 61 or the piston 79, the chamber 69 and the wall 64, which could then be defined by a cover substituted for the cover 35; this embodiment is not illustrated but implementing it on the basis of the embodiment illustrated and previously described lies well within the competence of those skilled in the art.

The device that has just been described constitutes a pneumatic spring with provision for adjusting the ground clearance and may be used as such on a vehicle.

However, it may also be provided with means for damping rotational movement of the arm 29 relative to the support 4 about the axis 8.

In this instance these damper means consist of brake means operative between members respectively fastened to the arm 29 and the support 4, resisting relative rotation about the axis 8 with a braking force conditioned by the rotation speed of the arm 29 relative to the support 4.

To this end, in the illustrated embodiment, the crank 9 carries towards the bottom, that is to say at the opposite end from the yoke 11, a plurality of dovetail-shaped ribs 80 parallel to the axis 8 on which can slide parallel to this axis but not rotate about this axis complementary shape grooves 81 formed in brake disk sectors 82 which are juxtaposed along the axis 8 relative to which they are disposed in respective perpendicular planes; there are two brake disk sectors 82 in the example illustrated, but one only of the sectors could suffice as likewise could more than two.

The brake disk sectors 82 are naturally disposed within the housing 22, like the crank 9, between the casing 18 and the flange 19.

Through the intermediary of the cover 28 the housing 22 carries a plurality of blade members 83 disposed in respective planes perpendicular to the axis 8 and located in the dihedron defined by the planes 38 and 14, beneath the plane 38 and on the same side of the plane 14 as the arm 29; the number and arrangment of the blade members 83 is such that each disk sector 82 is disposed between two such blade members; in other words, in the embodiment illustrated three blade members 83 are provided, one of which is disposed between the two disk sectors 82 while the other two are placed on respective sides of the assembly formed in this way by the two disk sectors 82 and the blade member 83 between them.

Each of the outside blade members 83 carries a known type brake lining 84 facing towards the immediately adjacent disk whereas the blade member 83 between the two disk sectors 82, or each such blade member, carries a brake lining 84 on either side.

To bring the brake linings 84 and the brake sectors 82 into contact under controled pressure their angular dimension relative to the axis 8 is such that contact with the brake linings 84 may be established in all relative positions of the arm 29 and the support 4 resulting from relative rotation about the axis 8 within the normal operating limits, the blade members 83 cooperating with conjugate-shaped grooves 127, 128 parallel to the axis 8 and defined conjointly by the cover 28 and the casing 18; these grooves 127, 128 guide the blade members 83 so that they slide in the direction parallel to the axis 8; the blade member 83 nearest the plate 6 of the support 4 bears against the casing 18 parallel to the axis 8, while the blade member 83 farthest away from the support 4, that is to say nearest the flange 19, is acted on by a hydraulic jack 85 which pushes on the blade member 83 so as to apply a predetermined force parallel to the axis 8 to the blade member 83 and through the blade member 83 to the set of disk sectors 82 via the linings 84.

To this end the flange 19 features at least one blind hole 86 facing towards the support 4, that is to say towards the interior of the housing 22, with its axis 87 parallel to the axis 8, and facing the plate 83 nearest the flange 19; this blind hole constitutes a cylinder within which a piston 88 sealed to the blind hole 86 by sealing means 89 can move in the direction of the axis 87, defining a fluid-tight chamber 90 within the blind hole 86; a helical compression spring 91 schematically shown in chain-dotted line is advantageously accommodated in the chamber 90 to provide a minimal contact pressure between the brake linings 84 and the disk sectors 82 in the absence of any pressurized fluid in the chamber 90.

The chamber 90 also contains a fluid the pressure of which is varied according to the rotation speed of the arm 29 about the axis 8 relative to the support 4, according to predetermined laws of which certain examples will be described by way of non-limiting illustration hereinafter.

For the purposes of achieving such control over the pressure of this fluid in the case of the embodiment of the invention shown in FIGS. 3 and 4, the shaft 7 carries a cam which is fastened to it, for example by bolts 92, within the housing 22 and directly facing the cover 27, the cam lying in a plane 100 perpendicular to the axis 8 and advantageously consisting, in the embodiment shown, of the abutment plate 93 attached to the shaft 7; this cam is seen particularly clearly in FIG. 4.

Along the axis 8 the cam 93 is pierced by a bore 94 through which the tube 72 passes with clearance comparable with that of the bore 73; in the radial direction away from the axis 8 and in any section plane perpendicular to this axis, its outside periphery 95 is of oval shape.

Above a horizontal plane 96 in which the axis 8 lies and which is fixed relative to the support 4 the shape of this periphery is immaterial provided that the cam 93 serves as an abutment plate, as previously described; below the plane 96 it is of circular shape with an axis 97 parallel to the axis 8 and situated in the plane 14 under the axis 8, so as to define a cam surface 98 featuring, under the axis 8 and in the plane 14, a point 99 which constitutes the point on the cam surface 98 farthest from the axis 8, the distance from the axis progressively decreasing for points on the cam surface 98 further and further away from the point 99 in one direction of movement of the surface 98 resulting from rotation about the axis 8 or in the opposite direction.

In the plane 100 of the cam 93, taken as the plane of its cam surface 98 and coincident with the section plane IV—IV in FIG. 3, the flange 19 has two cam followers 101 and 102 facing the cam surface 98 each fastened to the flange 19 in terms of rotation about the axis 8 but able to slide relative to the flange 19 in the radial direction relative to the axis 8 so as to remain in contact with the cam surface 98 whatever the angular position of the arm 29 relative to the support 4, for rotation about the axis 8, within the normal operating limits.

To this end the flange 19 comprises two bores 105 and 106 with respective axes 103 and 104 which are radial relative to the axis 8 and situated in the plane 100; each of the bores 105 and 106 discharges into the housing 22, towards the cam surface 98, being shut off at the opposite end by a respective plug 107, 108; the axes 103 and 104 are symmetrically positioned to each other relative to a plane coincident with the vertical plane 14 in the state of static equilibrium shown in FIGS. 1 and 4, with a mutual angular offset $\alpha$ of the axes 103 and 104 relative to the axis 8; this angular offset $\alpha$ is at least equal to the range of relative angular displacement between the arm 29 and the support 4 about the axis 8 under normal operating conditions; in the example illustrated this offset is in the order of 70°; this figure is given by way of non-limiting example only, of course.

Within each of the bores 105 and 106 is a respective piston 109, 110 sliding along the axis 103, 104 of the bore with respective helical compression spring 111, 112 disposed between the piston and the plug shutting off the corresponding bore urging the pistons 109, 110 elastically towards the axis 8 so that each projects out of the corresponding bore 105, 106 into the housing 22 and bears against the cam surface 98 through an end surface that is transverse relative to the axis of the corresponding bore, which surface defines the cam follower 101, 102.

Thus rotation of the arm 29 and of the axes 103 and 104 with it about the axis 8 relative to the support 4 and to the cam 93 results in alternating reciprocating movement of the two pistons 109 and 110 in the respective bores 105, 106 along the axes 103, 104 of the these bores; the cam is shaped according to the relative positions of the axes 103 and 104 so that movement of the arm 29 on rotation relative to the support 4 from the state of static equilibrium results, irrespective of the direction and amplitude of this movement within normal operating limits, in opposed movements of pistons 109, 110 in the bores 105, 106; thus in the example illustrated where the axes 103 and 104 are at 70° to each other and the cam surface 98 subtends an angle of at least 180° (at least $2\alpha$) at the axis 97, symmetrically distributed to either side of the plane 14, and if it is assumed that displacement of the arm 29 on rotation of the axis 8 relative to the support 4 from a position of the plane 38 corresonding to static equilibrium is limited to a maximum of 35° ($\alpha/2$) upwards or downwards, upward rotation of the arm 20 from the static equilibrium position results in:

movement of the point of contact with the cam surface 98 of the follower 102 defined by the piston 110 accommodated in the bore 106 on the same side of the plane 14 as the arm 29 when the plane 38 is horizontal away from the point 99, that is to say protrusion of the piston 110, movement of the point of contact with the cam surface 98 of the cam follower 101 defined by the piston 109 corresponding to the bore 105 situated on the other side of the plane 14 when the plane 38 is horizontal towards the point 99, that is to say retraction of the piston 109 into the bore 105.

Rotation in the opposite direction produces the converse effect.

Other respective orientations of the cam surface 98 and the bores accommodating the pistons 109 and 110 could be chosen without departing from the scope of the present invention, provided that there are results an effect of movement of the pistons in phase opposition on rotation of the arm in one direction or the other.

This effect is employed to pump hydraulic fluid into the housing 22 so as to establish by means of this hydraulic fluid a pressure in the chamber 90 operative on the brake piston 88.

To this end, as is seen particularly clearly on examining the piston 109 illustrated in FIG. 4, it being understood that the piston 110 is in all respects identical to the piston 109, each of the pistons 109 and 110 is hollow and has in the immediate vicinity of the corresponding cam follower 101, 102 a network of passages 131, 132 arranged so that these passages discharge continuously into the housing 22 wherever the cam follower 101, 102 touches the cam surface 98 within normal operating limits for the suspension system; within the respective piston each of the networks of passages 131, 132 discharges into an axial passage such as the passage 113 fitted with a check valve such as the valve 114 of a known design permitting passage of fluid from the channels such as 131 into the interior of the bores such as 105 through the channels such as 113 and preventing flow in the reverse direction; thus protrusion of the piston results in the feeding into the bores such as 105 of fluid from the housing 22 whereas retraction of the piston into the bore causes discharge of the fluid thus introduced through the intermediary of conduits such as 115 formed in the bores such as 105 in the immediate vicinity of the plugs such as 107 closing off the bores.

The conduit 115 and its counterpart 116 in the bore 106 comprise respective check valves 117, 118 of known type permitting fluid to flow in the direction out of the bores 105, 106 and preventing flow in the reverse direction, and the two conduits 115 and 116 are joined together on the output side of the check valves 117 and 118 relative to the permitted direction of flow to form a single conduit 119 from which branch the conduit 120 connected to the chamber 90 and two conduits 121 and 122 connected in parallel to a hydraulic fluid storage tank 123 which may consist of the housing 22 itself.

The conduit 121 comprises in series an adjustable relief valve 124 and the conduit 122 comprises an adjustable flow restriction used to establish an adjustable leakage flow through it; the restriction 125 may advantageously be conditioned by the respective downstream and upstream pressures in the conduit 122 so as to eliminate the effect of the viscosity of the fluid, in other words of temperature, on the leakage flowrate.

Thus when the arm 29 rotates in one direction or the other about the axis 8 relative to the support 4, one or other of the pistons 109, 110 feeds the conduit 119 with hydraulic fluid from the housing 22 at a flowrate dependent on the speed of displacement of the piston in its bore, that is to say on the speed of rotation of the arm relative to the support.

Passing through the restriction 125, this flow produces a pressure which is dependent on the head loss in the restriction and which is established uniformly in the conduits 119, 120, 121, 122 and consequently in the chamber 90, which applies to the brake linings 84 and brake disk sectors 82 a force directly proportional to the pressure in the conduit 119; by virtue of friction between the brake linings 84 and the brake disk sectors 82, this produces a damping force having above the axis 8 a damping moment opposing rotation of the arm 29 in the direction considered and proportional to the rotation speed; the head loss in the restriction 125 follows a substantially parabolic law so that small-amplitude movements of the pistons 109 and 110 in their respective bores have no effect on the piston 88, that is to say on the damping force due to pressurized contact between the friction linings 84 and the brake sectors 83.

Provided that the pressure in the conduits 119, 120, 121, 122 remains below the pressure that opens the relief valve 124, all of the flow of fluid is fed via the conduit 122 and the restriction 125 into the storage tank 123.

If the speed at which the arm 29 rotates about the axis 8 relative to the support 4 is sufficiently high for the fluid discharged by one or other of the pistons 109 and 110 according to the rotation direction to produce in the conduit 119 a pressure exceeding the threshold for opening the relief valve 124, which threshold is set according to a required maximum damping force, the fluid flows via the conduits 121 and 122 into the storage tank 123; the pressure in the conduits 119, 120, 121, 122 then remains constant and equal to the pressure that opens the relief valve 124; the damping force itself then remains constant at its maximum value.

The damping force substantially proportional to the pressure in the chamber 90, itself conditioned by the head loss created at 25 by the flow of fluid in the conduit 122, tends to be cancelled out as the flowrate reduces, that is to say in particular when the arm 29 is stationary relative to the support 4 between rotation in one direction and rotation in the opposite direction, since the two pistons 109 and 110 are then stationary; to maintain a residual flow through the restriction 125 in the conduit 122, that is to say to prevent virtually total cancellation of the damping force, during the transient phases in which the direction of rotation of the arm 29 about the axis relative to the support 4 is reversed, there is preferably provided a pressure accumulator 130 connected to the conduit 119 by a conduit 129; the pressure accumulator 130 is dimensioned to have a negligible effect on the pressure in the chamber 90 when the arm 29 rotates about the axis 8 relative to the support 4, at this time possibly serving only as a filter to reduce the effects of variations in the flowrate due to movements of the pistons 109 and 110 at high frequency in their respective bores.

By varying the slope of the cam surface 98, in other words by assigning different values to the angle between tangents to the cam surface 98 at various points relative to radii joining these points to the axis 8, it is possible not only to condition the force with which the brake linings 85 are pressed against the brake disk sectors 82 according to the rotation speed of the arm 29 about the axis 8 relative to the support 4, but also according to the angular position of the arm 29 relative to the support 4 during such rotation, for example to increase the damping and so harden up the suspension when the arm is approaching is permissible limit amplitudes, in normal use, relative an an average position defined, for example, by the plane 38 being horizontal.

Also, differing in this respect from what has been described and shown, the cam surface 98 may have a shape which is asymmetrical relative to the plane 14 with which the plane of symmetry between the respective axes 103, 104 of the bores 105, 106 is coincident when the arm 29 occupies its position of static equilibrium, and/or to use different cross-sections of the pistons 109 and 110 so as to obtain different damping forces according to the direction of rotation of the arm 29 relative to the support 4.

In the embodiment of the invention shown in FIGS. 5 through 8, the mechanohydraulic type conditioning means consisting in particular of the cam 93, the piston pumps 109 and 110 and the hydraulic circuit shown in FIG. 4 are replaced by electronic and electrohydraulic type conditioning means that are now to be described, with particular reference to FIG. 5; in other respects, however, the suspension unit is identical to that described with reference to FIGS. 1 through 4, so that FIG. 5 includes the reference numbers 3, 8, 18, 29, 37, 90 and 93, although it is to be understood that the abutment plate 93 does not have any cam surface function in the embodiment shown in FIG. 5.

In the case of this embodiment the casing 18 has fastened to it a potentiometer track 140 which is thus immobilized relative to the arm 29 in respect of rotation about the axis 8 relative to the support 4 (not shown in FIG. 5) and is in the shape of a body of revolution about the axis 8 subtending an angle at this axis at least equal to and preferably greater than the possible range of angular movement of the arm 29 about the axis 8 relative to the support 4 when the suspension unit is in service.

At one end the potentiometer track 140 is connected by an electrical conductor 141 to a constant voltage source integrated into an electronic control unit 142 to be described later and a sensor 143 bears on this track, with provision for relative rotation about the axis 8 with permanent electrical contact; the sensor 143 consists of a cursor carried by the support 4, through the intermediary of the abutment plate 93, with no possiblity of relative rotation about the axis 8; the angular position of the sensor 143 relative to the axis 8 on the abutment plate 93 is defined in such a way that the sensor 143 occupies relative to the potentiometer track 140 an angular position intermediate the respective angular positions of the ends of the track when the suspension unit occupies a position of static equilibrium and has sufficient possibility for angular movement to either side relative to the potentiometer track 140 to remain in contact with it irrespective of the amplitude of rotation of the arm 29 about the axis 8 relative to the support 4 when the suspension system is in service.

$V_0$ is the supply voltage fed to the potentiometer track 140 by the conductor 141 and the sensor 143 delivers a signal of voltage $V_1$ which is dependent on the angular position of the arm 29 relative to the support 4 with reference to the axis 8.

A signal of this kind may be obtained by other means, for example by reading an optical track 144 replacing the potentiometer track 140 by means of an optical sensor 145 replacing the electrical sensor 143, or by any other type of digital coding device; although incremental type digital encoders may be employed, it is preferable to use absolute type digital encoders delivering either a voltage $V_1$ from a digital-to-analogue converter incorporated into the sensor or a coded digital indication directly representing the angular position of the arm 29 relative to the support 4 at any time and therefore directly usable to control any attitude correction.

Those skilled in the art will readily understand that other types of sensor may also be used without departing from the scope of the present invention, for example a tachogenerator type sensor delivering a signal in the form of a voltage directly proportional to the speed of rotation of the arm 29 about the axis 8 relative to the support 4, its sign representing the direction of such rotation.

The signal produced by the sensor 143 or 144, or some other form of sensor, is routed to the electronic control unit 142 which stores the signal and, if it is a signal representing the angular position or the angular displacement of the arm 29 relative to the support 4, derives from it a signal representing the speed of rotation of the arm 29 relative to the support 4, with a sign characterizing the direction of such rotation.

The signal representing the speed is then processed by the electronic control unit 142 according to laws stored in it to produce an electrical signal $V_2$ used to condition the hydraulic pressure applied to the chamber 90 of the brake by means of a pressure modulator 147 and from a source 146 of pressurized hydraulic fluid, fed from a storage tank 148 that may advantageously consist of the housing 22.

Various types of hydraulic actuator may be employed as the pressure modulator 147 without departing from the scope of the present invention, provided that they make it possible to modulate a pressure according to an electrical signal $V_2$ either in an open loop circuit or in a closed loop circuit with pressure feedback from a pressure sensor placed near the chamber 90, for example.

Thus, in a way which is not illustrated, the modulator 147 might consist of a "pressure" servo-valve driven by the electrical signal $V_2$ or a "flowrate" servo-valve incorporating a pressure control system (that could advantageously be incorporated into the electronic control unit 142) using feedback information from the pressure sensor 156.

In the example illustrated the pressure modulator 147 consists of a slide valve 149 occupying at all times a position of equilibrium between forces exerted on it by a proportional solenoid 150 to which the electrical signal $V_2$ is fed by an electrical conductor 151 and the feedback hydraulic pressure in a chamber 152 so as to establish in a conduit 154 leading to the chamber 90 a pressure modulated between extreme values delivered by a conduit 153 from the source 146 and a conduit 155 returning fluid to the storage tank 148.

The conduit 154 is a branch from a conduit 156 feeding duplicate pressure to the chamber 152.

As previously stated, the signal $V_2$ controlling the displacement of the slide valve 149, that is to say modulating the pressure in the chamber 90, is determined by the electronic control unit 142 according to the signal representing the speed of rotation of the arm 29 about the axis 8 relative to the support 4 and on the basis of laws stored in the electronic control unit 142 and which may be chosen at will.

FIG. 6 shows by way of non-limiting example on way of varying the damping moment M (directly proportional to the damping force) as a function of the speed V of rotation of the arm 29 about the axis 8 relative to the support 4; the positive abscissae and ordinates correspond to upward movement of the rolling member 3 relative to the support 4 whereas the negative abscissae and ordinates correspond to downward movement of the rolling member 3 relative to the support 4.

In this example, if the rolling member 3 moves upwards relative to the support 4 the increase in the speed V of rotation of the arm 29 about the axis 8 relative to the support 4 from a null or substantially null value $V_0$ results in the following change in the damping moment M:

from the initial value $V_0$ to a value $V_1$ the damping moment increases substantially proportionally to the speed from an initial value $M_0$ due to the action of the spring 91 on the piston 88 in the chamber 90 to a value $M_1$ which constitutes a maximum value;

when the speed V increases from $V_1$ to $V_2$ the damping moment remains constant at the value $M_1$;

when the speed further increases from the value $V_2$ to a maximum value $V_3$ the damping moment decreases from the value $M_1$ to the value $M_2$ in substantially inverse proportion to the increase in the speed.

The values $V_0$, $V_1$, $V_2$, $V_3$, $M_0$, $M_1$, $M_2$ are naturally predetermined at will and other laws of variation might be chosen; by way of non-limiting example, FIG. 6 also shows two other ways in which the damping moment M can be made to vary as a function of the speed V when the rolling member 3 moves upwardly, namely:

a variation mode identical to that which has just been described except that the damping moment remains constant at the value $M_1$ from the speed $V_1$ to the speed $V_3$ constituting an envisaged maximum speed, as shown in dashed line;

a variation mode shown in chain-dotted line whereby the moment increases approximately proportionally to the speed of rotation from the value $M_0$ to the value $M_2$ as the speed of rotation increases from the value $V_0$ to the value $V_1$, then remains constant at the value $M_2$ as the speed increases from the value $V_1$ to the value $V_2$, then increases proportionally with the speed to the value $M_1$ as the speed increases from the value $V_2$ to the value $V_3$.

A mode of variation for downward displacement of the rolling member is also shown by way of non-limiting example, whereby:

the absolute value of the damping moment increases substantially proportionally to the absolute value of the speed of rotation of the arm 29 abaout the axis 8 relative to the support 4, increasing from the value $M_0$ to the predetermined value $|M_3|$ as the speed increases from the value $V_0$ to a predetermined value $V_4$;

the damping moment remains constant at the value $M_3$ as the speed increases from the value $V_4$ to teh value $V_5$, which is predetermined and greater in absolute terms then the value $V_4$;

the absolute value of the damping moment increases substantially proportionally to the absolute value of the speed as this increases from the value $V_5$ to a predetermined value $V_6$, the damping moment then increasing from the value $M_3$ to a predetermined value $M_4$.

It is possible to employ only one specific curve for the variation in the damping moment as a function of the speed or rotation of the arm 29 about the axis 8 relative to the support 4 in determining the signal $V_2$ controlling the pressure in the chamber 90, that is to say the damping force and the damping moment, exclusively as a function of the speed of rotation of the arm 29 about the second axis 8 relative to the support 4 in either direction.

However, it is particularly convenient to also take into account the angular position of the arm at any given time so as to condition the damping force or moment according to this variable also.

To this end the electronic control unit 142 also stores a curve of the type illustrated by way of non-limiting example only in FIG. 7, namely a curve of the damping moment M as a function of the angular displacement D of the arm 29 about the axis 8 relative to the support 4 from the position of static equilibrium; the positive abscissae and ordinates correspond to rotation in a direction corresponding for the roling member 3 to a displacement above the position of static equilibrium relative to the support 4 while the negative abscissae and ordinates correspond to displacement of the arm when the rolling member 3 is below its position of static equilibrium relative to the support 4.

In the non-limiting example shown in FIG. 7 the increasing amplitude of angular displacement of the arm 29 about the axis 8 relative to the support 4 when the rolling member 3 is above its position of static equilibrium produces the following change in the damping moment M:

an increase from a null or practically null initial value $D_0$ to a value $D_1$ causing a substantially proportional increase in the damping moment from the aforementioned value $M_0$ to a value $M_5$ below the aforementioned value $M_1$;

as the angular amplitude then increases from the value $D_1$ to a value $D_2$ the damping moment remains constant at the value $M_5$;

as the amplitude of displacement increases from the value $D_2$ to the value $D_3$, considered as a maximum value, the damping moment increases substantially proportionally to it up to the aforementioned maximum value $M_1$.

An inverse change occurs when the amplitude of displacement decreases with the rolling member 3 above its position of static equilibrium relative to the support 4.

On displacement with the rolling member 3 below this position, an increase in the absolute value of the amplitude of the angular displacement of the arm 29 from the position of static equilibrium produces the following changes:

the absolute value of the damping moment increases substantially proportionally to the absolute value of the amplitude as this increases from a null or practially null initial value $D_0$ to a value $D_4$, the damping moment increasing from the value $-M_0$ to a value $M_6$ the absolute value of which is less than the absolute value $M_4$;

the damping moment remains constant at the value $M_6$ as the amplitude increases from the value $D_4$ to a value $D_5$;

the absolute value of the damping moment increases proportionally to the absolute value of the amplitude of the displacement as this increases from the value $D_5$ to a value $D_6$, the damping moment increasing from the value $M_6$ to the aforementioned value $M_4$.

An inverse change occurs as the arm 29 returns to its position of static equilibrium.

The values $D_0$, $D_1$, $D_2$, $D_3$, $D_4$, $D_5$, $D_6$, $M_5$, $M_6$ may naturally be predetermined at will; however, $M_5$ is preferably equal to $M_2$ and likewise $M_6$ to $M_3$.

Assuming these values, FIG. 8 shows a three-dimensional diagram representing the evolution of the damping moment M as a function of the speed V of rotation of the arm 29 about the axis 8 relative to the support 4 and the amplitude D of this rotation starting from the position of static equilibrium as the rolling member 3 moves upwards above the position of static equilibrium, it being understood that analogous curves could be plotted for displacements of the rolling member 3 downwards when above its position of static equilibrium and also upwards and downwards when below its position of static equilibrium.

Control curves as a function of speed or amplitude may naturally be established, in a manner readily determined by those skilled in the art, to incorporate a filter action rendering the damping moment insensitive to low-speed and/or low-amplitude and/or high-frequency rotation of the arm 29 about the axis 8 relative to the support 4; the change in the damping moment M from the value $M_1$ to the value $M_2$ as the rotation speed of the arm increases from the value $V_2$ to the value $V_3$, as shown in full line in FIG. 6, constitutes a filtering against high-frequency alternating rotation consisting of rapid alternating increases in the rotation speed of the arm in one direction and in the other; the values $M_0$, $V_0$, $D_0$ chosen determine greater or lesser sensitivity of the damping moment to low-speed and/or low-amplitude rotation of the arm relative to the support.

Those skilled in the art will easily understand that the design of the electronic control unit 142 for implementing control systems of the type indicated above or of other types lies well within their normal competence.

By placing the brake disk sectors 82 and the linings 84 in the lower part of the housing 22 they are certain to be immersed at all times in the hydraulic fluid in the housing 22.

Thus these components are permanently lubricated and cooled.

To procure the same effect at the level of the slide member 55, the piston 47 and the journal 12, means may advantageously be provided to ensure that, despite temporary removal of hydraulic fluid from the housing and movement of the piston 47 in the liner 44, and whatever the temperature of the fluid, the housing 22 is filled to the maximum with hydraulic fluid at least in certain angular positions of the arm relative to the support, under normal operating conditions.

To this end there is advantageously provided within the housing 22 an elastically expandable, fluid-tight flexible material bladder 126 which contains a gas under pressure which, like the compressible fluid accommodated in the chambers 56 and 42, may advantageously be nitrogen; in a particularly advantageous manner the bladder is placed in the chamber 41 delimited internally of the cavity 32 by the bulkhead 40 so that, by virtue of this position, variations in the volume of the bladder 126 procure circulation of the hydraulic fluid from the housing 22 in the immediate vicinity of the brake linings 84 and brake disk sectors 82.

In alternative embodiments the bladder 126 could be complemented or replaced by accumulator means serving the same function and disposed appropriately.

The embodiments of the invention that have just been described constitute non-limiting examples only and numerous variations may be made to the arrangements which have just been described without departing from the scope of the present invention.

We claim:

1. Suspension unit for vehicles comprising:
a support adapted to be attached to a framework of the vehicle,
a longitudinal arm, means coupling a rolling member to said arm defining a transverse first axis of rotation of said rolling member relative to said arm, means coupling said arm to said support defining a transverse second axis of rotation of said arm relative to said support, said second axis being parallel to said first axis and offset from it longitudinally, means coupling said arm to said support defining an angular equilibrium position of said arm for rotation about said second axis relative to said support and elastically enabling rotation of said arm about said second axis relative to said support in two opposite directions from said angular equilibrium position, two complementary friction brake members, means immobilizing said friction brake members against rotation about said second axis respectively relative to said arm and said support, means pressing together said friction brake members, means conditioning the force with which said pressing means press said friction brake members together according to the speed of rotation of said arm about said second axis relative to said support in a first direction, and means conditioning the force with which said pressing means press said friction brake members together according to the speed of rotation of said arm about said second axis relative to said support in a second direction opposite to said first direction.

2. Suspension unit according to claim 1, further comprising means conditioning the force with which said pressing means press said friction brake members together according to the amplitude of rotation of said arm about said second axis relative to said support in at least one of said first direction and said second direction.

3. Suspension unit according to claim 1, wherein said means conditioning the force with which said pressing means press said friction brake members together according to the speed of rotation of said arm about said second axis relative to said support in at least one of said first direction and said second direction also constitute means conditioning the force with which said pressing means press said friction brake members together according to the amplitude of rotation of said arm about said second axis relative to said support.

4. Suspension unit according to claim 1, further comprising means limiting the force with which said pressing means press said friction brake members together.

5. Suspension unit according to claim 1, further comprising means rendering said force with which said pressing means press said friction brake members together substantially independent of each of those speeds low-amplitude and high-frequency rotation of said arm about said second axis relative to said support.

6. Suspension unit for vehicles comprising:

a support adapted to be attached to a framework of the vehicle, a longitudinal arm, means coupling a rolling member to said arm defining a transverse first axis of rotation of said rolling member relative to said arm, means coupling said arm to said support defining a transverse second axis of rotation of said arm relative to said support, said second axis being parallel to said first axis and offset from it longitudinally, means coupling said arm to said support defining an angular equilibrium position of said arm for rotation about said second axis relative to said support and elastically enabling rotation of said arm about said second axis relative to said support in two opposite directions from said angular equilibrium position, two complementary friction brake members, means immobilizing said friction brake members against rotation about said second axis respectively relative to said arm and said support, means pressing together said friction brake members, means sensing the speed of rotation of said arm about said second axis relative to said support in a first direction and producing a first signal the value of which is representative of said rotation speed, means controling said means pressing together said friction brake members according to the value of said first signal to condition the force with which said pressing means press said friction brake members together according to said value of said first signal, and means sensing the speed of rotation of said arm about said second axis relative to said support in a second direction opposite to said first direction and producing a second signal the value of which is representative of said rotation speed, said control means also controling said means pressing together said friction brake members according to the value of said second signal to condition the force with which said pressing means press said friction brake members together according to said value of said second signal.

7. Suspension unit according to claim 6, further comprising means conditioning the at least one of said first signal and said second signal according to the angular position of said arm relative to said support.

8. Suspension unit according to claim 6, wherein said first and second signals are electrical signals.

9. Suspension unit according to claim 8, wherein said sensing means are selected from the group comprising electromechanical, electromagnetic and opto-electronic sensing means and said control means are selected from the group comprising electronic, electrohydraulic and electromechanical control means.

10. Suspension unit according to claim 6, wherein said first and second signals are hydraulic signals.

11. Suspension unit according to claim 10, wherein said sensing means are mechanohydraulic sensing means and said control means are mechanohydraulic control means.

12. Suspension unit according to claim 6, further comprising means filtering said first and second signals to limit said force with which said pressing means press said friction brake members together.

13. Suspension unit according to claim 6, further comprising means filtering said first and second signals to render said force with which said pressing means press said friction brake members together substantially independent of each of low-speed, low-amplitude and high-frequency rotation of said arm about said second axis relative to said support.

14. Suspension unit for vehicles comprising:

a support adapted to be attached to a framework of the vehicle, a longitudinal arm, means coupling a rolling member to said arm defining a transverse first axis of rotation of said rolling member relative to said arm, means coupling said arm to said support defining a transverse second axis of rotation of said arm relative to said support, said second axis being parallel to said first axis and offset from it longitudinally, means coupling said arm to said support defining an angular equilibrium position of said arm for rotation about said second axis relative to said support and elastically enabling rotation of said arm about said second axis relative to said support in two opposite directions from said angular equilibrium position, two complementary friction brake members, means immobilizing said friction brake members against rotation about said second axis respectively relative to said arm and said support, hydraulic jack means pressing together said friction brake members, a storage tank for hydraulic fluid, means pumping hydraulic fluid in said storage tank to said hydraulic jack means, means returning hydraulic fluid from said hydraulic jack means to said storage tank and incorporating means determining a calibrated leakage flowrate, means driving said first pumping means by rotation of said arm about said second axis relative to said support so that rotation of said arm relative to said support in a first direction causes fluid to flow towards said hydraulic jack means and said return means to establish a damping action conditioned at least by the speed of rotation of said arm relative to said support and rotation of said arm relative to said support in a second direction opposite to said first direction causes fluid to be pumped in said storage tank, means pumping hydraulic fluid in said storage tank to said hydraulic jack means, means driving said second pumping means in phase opposition to said first pumping means by rotation of said arm about said second axis relative to said support so that rotation of said arm relative to said support in said first direction causes fluid to be pumped into said storage tank and rotation of said arm relative to said support in said second direction causes fluid to flow to said hydraulic jack means and said return means to establish a damping action conditioned at least by the speed of rotation of said arm relative to said support, respective check valves disposed between each of said first and second pumping means and said hydraulic jack means to permit fluid to flow towards said hydraulic jack means.

15. Suspension unit according to claim 14, wherein said first and second pumping means comprise two bores and two pistons each incorporating a check valve and each sliding in a respective one of said bores and said means driving said first and second pumping means comprise a cam, two cam followers each fastened to a respective one of said pistons and spring means pressing said cam followers against said cam, said system further comprising means translating rotation of said arm about said second axis relative to said support into an identical rotation of said two bores about said second axis relative to said cam and movement of said pistons in phase opposition.

16. Suspension unit according to claim 15, wherein said cam is symmetrical relative to a plane coincident with a plane of symmetry between said bores and which contains said second axis in said equilibrium position.

17. Suspension unit according to claim 15, wherein said cam is asymmetrical relative to a plane coincident with a plane of symmetry between said bores and which contains said second axis in said equilibrium position.

18. Suspension unit according to claim 15, wherein said pistons have the same cross-section.

19. Suspension unit according to claim 15, wherein said pistons have different cross-sections.

20. Suspension unit according to claim 15, wherein said cam is of varying slope.

21. Suspension unit according to claim 15, wherein said two bores are fixed with respect to said arm and said cam is fixed with respect to said support.

22. Suspension unit according to claim 14, wherein said means returning fluid from said hydraulic jack means to said storage tank comprise a relief valve.

23. Suspension unit according to claim 14, further comprising pressure accumulator means between said first and second pumping means and said hydraulic jack means.

24. Suspension unit according to claim 14, wherein said hydraulic fluid storage tank comprises a housing used to couple said arm to said support.

25. Suspension unit according to claim 24, wherein said complementary friction brake members and said hydraulic jack means are in a lower part of said housing.

26. Suspension unit according to claim 25, further comprising means establishing a flow of hydraulic fluid in said housing around said complementary friction brake members and said hydraulic jack means on rotation of said arm about said second axis relative to said support.

27. Suspension unit according to claim 25, wherein said first and second pumping means discharge into a lower part of said housing.

28. Suspension unit according to claim 25, wherein a first of said brake members comprises at least one brake disk sector perpendicular to said second axis, a second of said members comprises at least two brake linings perpendicular to said second axis and juxtaposed to said at least one brake disk sector on respective sides thereof, and said hydraulic jack means comprise at least one cylinder with its axis parallel to said second axis and a piston sliding in said at least one cylinder to press said linings against said brake disk sector parallel to said second axis.

29. Suspension unit according to claim 28, wherein said brake disk is immobilized against rotation about said second axis relative to said support and said brake linings and said cylinder of said hydraulic jack means are immobilized against rotation about said second axis relative to said arm.

* * * * *